(12) United States Patent
Weiskopf et al.

(10) Patent No.: US 7,357,629 B2
(45) Date of Patent: Apr. 15, 2008

(54) APPARATUS AND METHOD FOR ALIGNING A REMOVABLE BUILD CHAMBER WITHIN A PROCESS CHAMBER

(75) Inventors: Paul M. Weiskopf, La Mesa, CA (US);
Kenneth A. Regas, Poway, CA (US);
Christian M. Merot, Mesa, CO (US);
James H. Sykora, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 218 days.

(21) Appl. No.: 11/088,133

(22) Filed: Mar. 23, 2005

(65) Prior Publication Data
US 2007/0057412 A1  Mar. 15, 2007

(51) Int. Cl.
*B29C 35/08* (2006.01)
(52) U.S. Cl. ...................................... 425/188; 425/174
(58) Field of Classification Search ................ 425/174, 425/174.4, 188, 375
See application file for complete search history.

(56) References Cited

U.S. PATENT DOCUMENTS

| | | | |
|---|---|---|---|
| 4,247,508 A | 1/1981 | Housholder | 264/219 |
| 4,863,538 A | 9/1989 | Deckard | 264/497 |
| 4,944,817 A | 7/1990 | Bourell et al. | 264/497 |
| 5,132,143 A | 7/1992 | Deckard | 264/497 |
| 5,252,264 A * | 10/1993 | Forderhase et al. | 264/497 |
| 5,506,607 A * | 4/1996 | Sanders et al. | 347/1 |
| 5,622,577 A | 4/1997 | O'Connor | 156/62.2 |
| 5,658,412 A | 8/1997 | Retallick et al. | 156/272.2 |
| 5,846,370 A | 12/1998 | O'Connor | 156/272.2 |
| 6,261,077 B1 * | 7/2001 | Bishop et al. | 425/174.4 |
| 6,554,600 B1 | 4/2003 | Hoffmann et al. | 425/174.4 |
| 6,989,115 B2 * | 1/2006 | Russell et al. | 264/39 |
| 7,004,222 B2 * | 2/2006 | Ederer et al. | 164/155.1 |
| 2004/0035542 A1 * | 2/2004 | Ederer et al. | 164/45 |

* cited by examiner

*Primary Examiner*—Yogendra N. Gupta
*Assistant Examiner*—Emmanuel S Luk
(74) *Attorney, Agent, or Firm*—Summa, Allan & Additon, P.A.

(57) ABSTRACT

The invention is a rapid prototype apparatus having a removable build chamber and a plurality of alignments surfaces that can be used to properly align the build chamber with the process chamber with minimal adjustments by a user. In one embodiment, the apparatus comprises a process chamber attached to a support housing and a build chamber that is removably attached to the support housing. The build chamber may be inserted into the support housing and is moveable between a load position and a build position. The build chamber includes a moveable build platform and a plurality of alignment surfaces that are each adapted to releasably engage a corresponding surface on the support housing. As the build chamber moves into the build position, the alignment surfaces align the build platform the process chamber. As a result, the apparatus may be used to accurately align the build chamber with the process chamber.

23 Claims, 10 Drawing Sheets

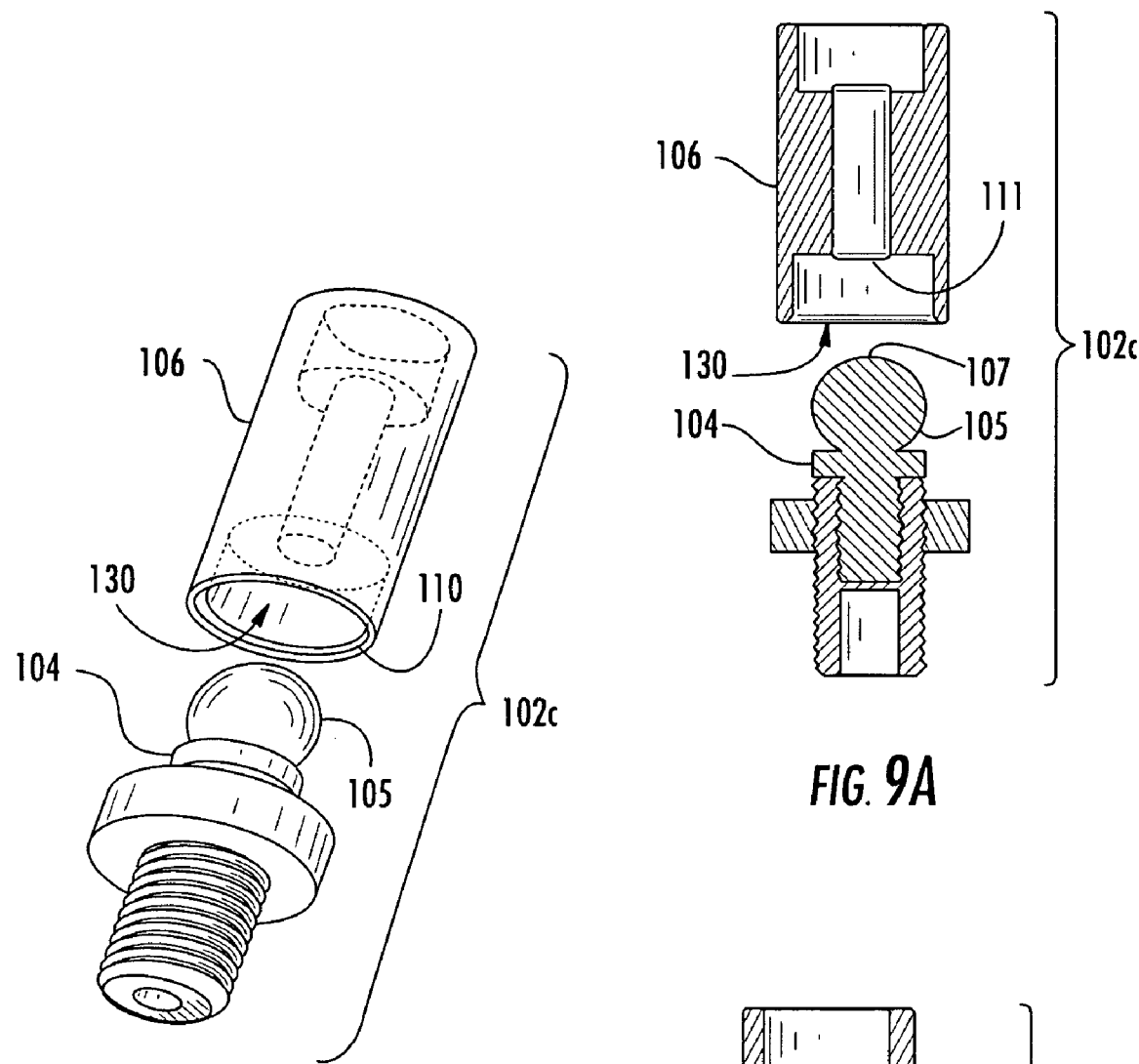
FIG. 8
FIG. 9A
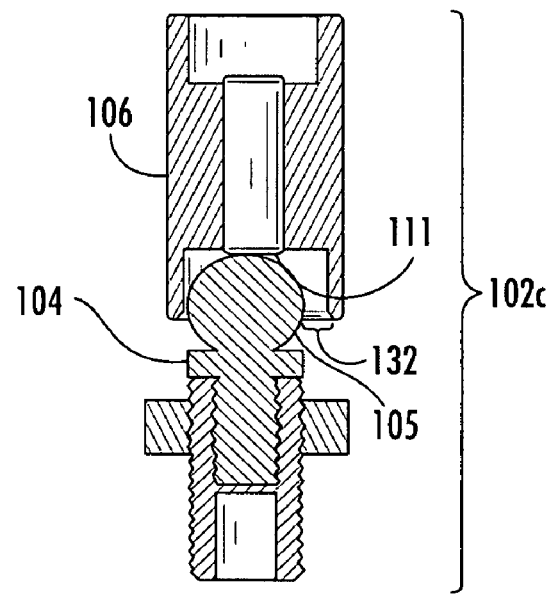
FIG. 9B

APPARATUS AND METHOD FOR ALIGNING A REMOVABLE BUILD CHAMBER WITHIN A PROCESS CHAMBER

BACKGROUND OF THE INVENTION

The invention relates generally to a method of rapid prototyping and manufacturing and, more particularly, to laser sintering.

Rapid prototyping and manufacturing (RP&M) is the name given to a field of technologies that can be used to form three-dimensional objects rapidly and automatically from computer data representing the objects. In general, rapid prototyping and manufacturing techniques build three-dimensional objects, layer-by-layer, from a working medium utilizing sliced data sets representing cross-sections of the object to be formed. Typically an object representation is initially provided by a Computer Aided Design (CAD) system. RP&M techniques are sometimes referred to as solid imaging and include stereolithography, ink jet printing as applied to solid imaging, and laser sintering.

A laser sintering apparatus dispenses a thin layer of heat-fusible powder, often a fusible polymer powder, polymer coated metal, or ceramic, over a bed of the powder commonly referred to as the "part cake." The laser sintering apparatus then applies thermal energy to melt those portions of the powder layer corresponding to a cross-section of the article being built in that powder layer. Lasers typically supply the thermal energy through modulation and precise directional control to a targeted area of the powder layer. Conventional selective laser sintering systems, such as the Vanguard system available from 3D Systems, Inc., use carbon dioxide lasers and position the laser beam by way of galvanometer-driven mirrors that deflect the laser beam.

The part cake typically includes a moveable build platform upon which the bed of powder is disposed. After a powder layer is fused, the build platform moves downward by an incremental distance and the apparatus then dispenses an additional layer of powder onto the previously fused layer and repeats the process of melting and selective fusing of the powder in this next layer, with fused portions of later layers fusing to fused portions of previous layers as appropriate for the article, until the article is complete. These articles are sometimes referred to as "built parts." Each additional layer of powder is typically dispensed from a powder feed system that dispenses a measured amount of powder onto the part cake. A powder spreader, such as a blade or roller then picks up and spreads the powder over the part cake bed in a uniform manner.

Detailed descriptions of laser sintering technology may be found in U.S. Pat. Nos. 4,863,538; 5,132,143; and 4,944,817, all assigned to Board of Regents, The University of Texas System, and in U.S. Pat. No. 4,247,508 to Housholder.

Generally, once the part is built it remains within the process chamber under an inert atmosphere until the newly formed part has cooled. Cooling may require several hours or days. As a result, the RP&M apparatus may be inactive during the cooling time, which may cause the apparatus to be unavailable for subsequent builds.

RP&M apparatuses have been developed that include a removable build chamber in which the build platform may be disposed. The build chamber including the newly built part may be separated from the process chamber and the part can then be cooled in the build chamber. A fresh build chamber can then be placed into the process chamber so that a new part may be built. The build chamber must be positioned within the process chamber so that the powder bed and the build platform are properly aligned. Incorrect alignment of the powder spreader and the vertical travel of the build platform may result in the depositing of non-uniform powder layers and/or lateral misalignment on successive fused layers of powder. Building a part on an incorrectly aligned build platform may result in a defective part that may be unusable. Proper alignment of the build platform with the powder spreader may require a user to make many adjustments and measurements. The alignment process may result in loss time and inefficiencies in the RP&M process.

U.S. Pat. No. 6,554,600 describes a RP&M apparatus having a container that is manually inserted into the RP&M apparatus by physically lifting it up and placing it into the interior of the apparatus. Once placed in the apparatus, the container is stationary until it is removed from the container. The container is supported by rails on opposing sidewalls that position the container and align it with a reciprocatable overhead hopper system having a blade attached to the bottom of the hopper opening to deliver and then spread the powder. The insertable container has four side walls and a moveable platform having a size that is equal to the internal cross-section of the apparatus. A lifting mechanism moves the platform up and down as needed. After a part has been built, a user must physically lift the container including the part and any unsintered powder out of the apparatus. Physically lifting the container may be undesirable because the container may be heavy and the lifting process could cause the part to shift resulting in damage to the part.

Thus, there exists a need for a RP&M apparatus having a removable build chamber that can be quickly attached and aligned with a process chamber.

BRIEF SUMMARY OF THE INVENTION

The invention addresses the above needs and achieves other advantages, by providing a rapid prototype apparatus having a removable build chamber and a plurality of alignments surfaces that can be used to properly align the build chamber with the process chamber with minimal adjustments by a user. As a result, the apparatus can be used to accurately and efficiently align the build chamber with the process chamber. After completion of a build, the newly built part may be removed from the process chamber and allowed to cool in the build chamber. A second build chamber may then be removably joined to the process chamber and the building of a new part may commence.

In one embodiment of the invention, the rapid prototype apparatus may comprise a process chamber, a support housing, and a build chamber that is removably attached to the support housing. The process chamber may be supported by and attached to the support housing. The build chamber may be removably inserted into the support housing and moveable between a load position and a build position. The build chamber includes a moveable build platform and a plurality of alignment surfaces that are each adapted to releasably engage a corresponding surface on the support housing. When the build chamber is moved into the build position, the alignment surfaces align the build platform with a powder bed disposed in the process chamber with minimal or no adjustment by a user. As a result, the apparatus may be used to efficiently and accurately align the build chamber with the process chamber.

In some embodiments of the invention, the alignment surfaces on the build chamber comprise outwardly extending projections that may be in the form of a tooling ball.

Each tooling ball may be adapted to be removably inserted into a corresponding recess on the support housing. The positions of the tooling balls and recesses are such that as the tooling balls move into the recesses, the build chamber is moved into correct alignment with the process chamber. In some embodiments, the recesses may include a chamfer at the opening of the recess that allows for some initial misalignment of the build chamber with the process chamber as the build chamber is moved toward the build position. Continued movement of the build chamber causes the tooling balls to be received farther into the recesses.

In another embodiment, the rapid prototype apparatus includes three pairs of alignment surfaces, wherein each pair comprises a tooling ball and corresponding recess. In this embodiment, each recess may be configured to have a different geometry. A first alignment pair comprises a tooling ball and recess having little clearance between the surface of the tooling ball and the inner surface of the recess. As a result, the tooling ball has little to no lateral movement when inserted into the recess. A second alignment pair includes a recess having an oblong or rectangular shape. This recess allows more movement of tooling ball along the length of the recess while limiting the tooling balls movement along the width of the recess. The first and second pairs of alignment surfaces function to position the build chamber so that the build platform may have the correct horizontal alignment with the powder bed. The third alignment pair includes an oversized recess that allows the tooling ball to move laterally in all directions. The third alignment pair cooperates with the first and second pairs to define a horizontal plane so that the build platform may be moved into the correct vertical alignment with the powder bed.

Thus, the invention provides an apparatus and method that can be used to quickly and accurately align a removable build chamber with a process chamber.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8 is a graphical illustration of a alignment pair that is used in conjunction with the alignment pairs of FIGS. 4 and 6 to vertically align the build platform with the powder bed;

FIG. 9A is a cross sectional view of the alignment pair of FIG. 8 viewed along line 9A of FIG. 3;

FIG. 9B is a cross sectional view of the alignment pair of FIG. 8 depicting the tooling ball seated in the recess;

Figure 1:
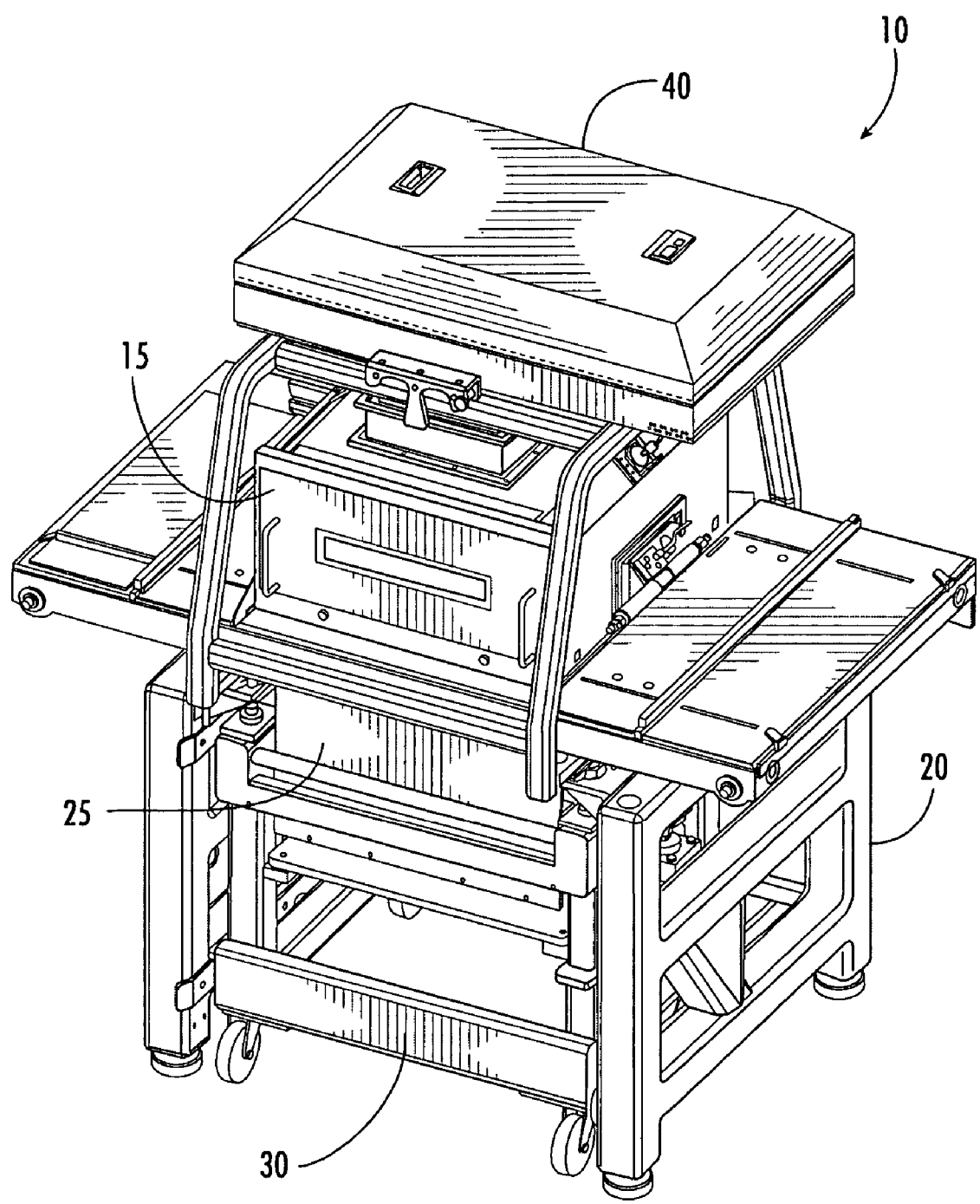
FIG. 1 is a graphical illustration of a rapid prototype apparatus having a removable build chamber.

With reference to FIG. 1, a rapid prototype apparatus having a removable build chamber is illustrated and broadly designated as reference number 10. The rapid prototype apparatus 10 includes a process chamber 15, an associated support housing 20, and a removable build chamber 25 that may be supported by a build carriage 30. The build carriage 30 along with the build chamber 25 may be removably inserted into the support housing. In some embodiments, the rapid prototype apparatus 10 may include a lifting device (not shown in FIG. 1) that is adapted to move the build chamber 25 between a load position and a build position. As used herein, the term "build position" refers to the position of the build chamber wherein the build platform is properly aligned with the powder bed such that vertical travel of the build platform is substantially perpendicular to the powder bed. In the build position the rapid prototype apparatus 10 is ready to build parts. The lifting device can comprise hydraulic or pneumatic cylinders, electric motors, or the like.

The build chamber 25 may also include a plurality of alignment surfaces (not visible in FIG. 1) that are each adapted to releasably engage a corresponding surface on the support housing. As the build chamber is moved into the build position, the alignments surfaces engage the corresponding surfaces on the support housing and position the build chamber so it is properly aligned with the process chamber. In embodiments directed to selective laser sintering, the apparatus 10 may also include an associated laser unit 40 that includes the laser and associated mechanisms for generating and targeting a laser beam within the process chamber.

Figure 2A:
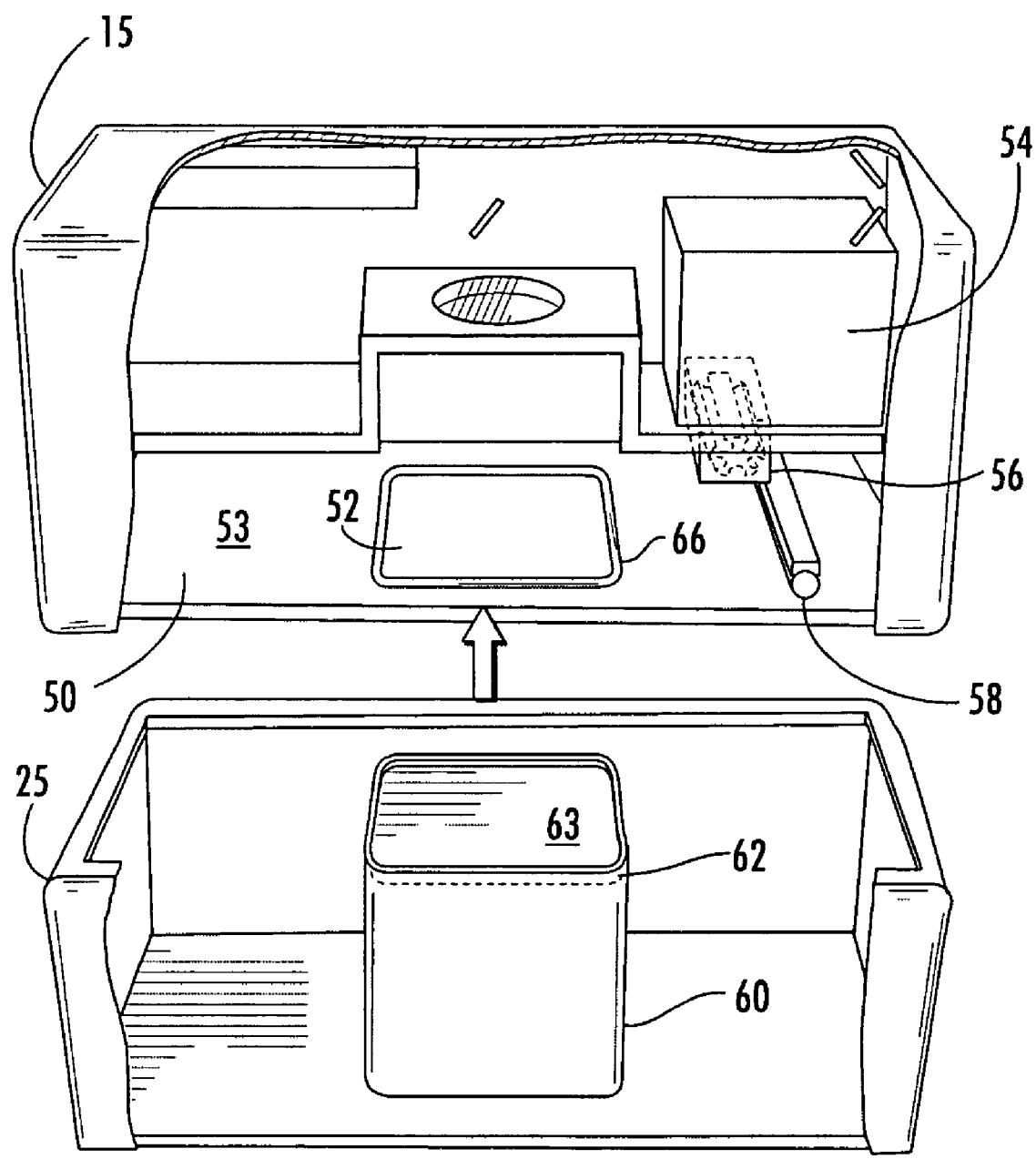
FIGS. 2A through 2C are graphical illustrations depicting the build chamber being moved into the build position and the process of building a part.
Figure 2B:
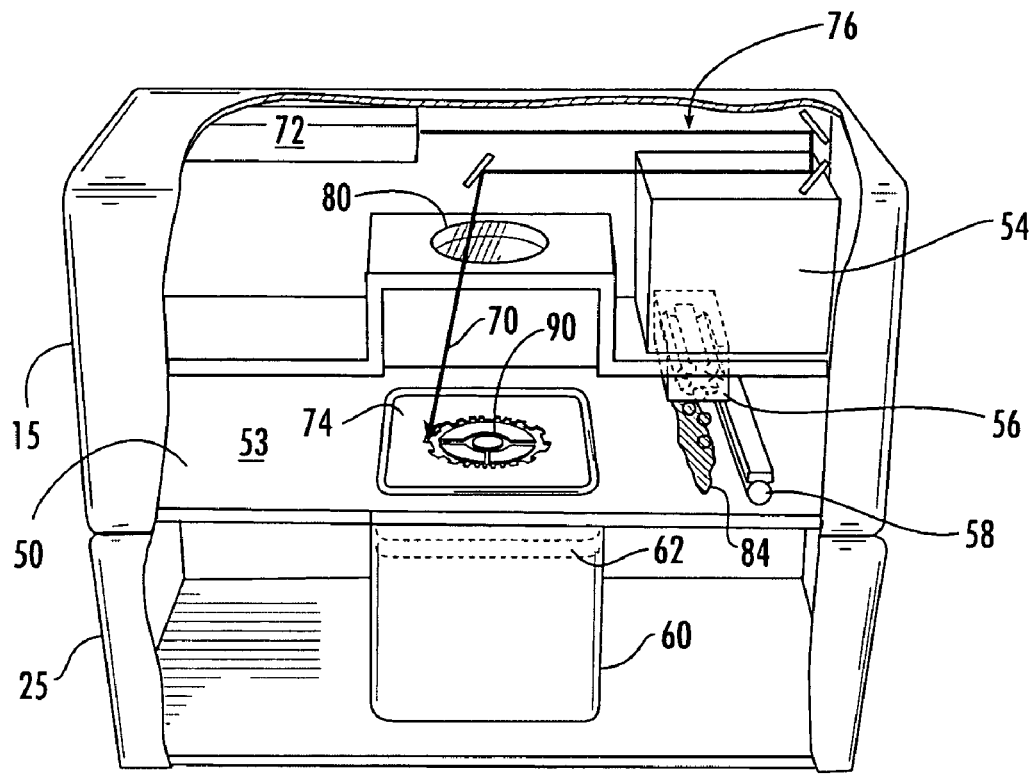
Figure 2C:
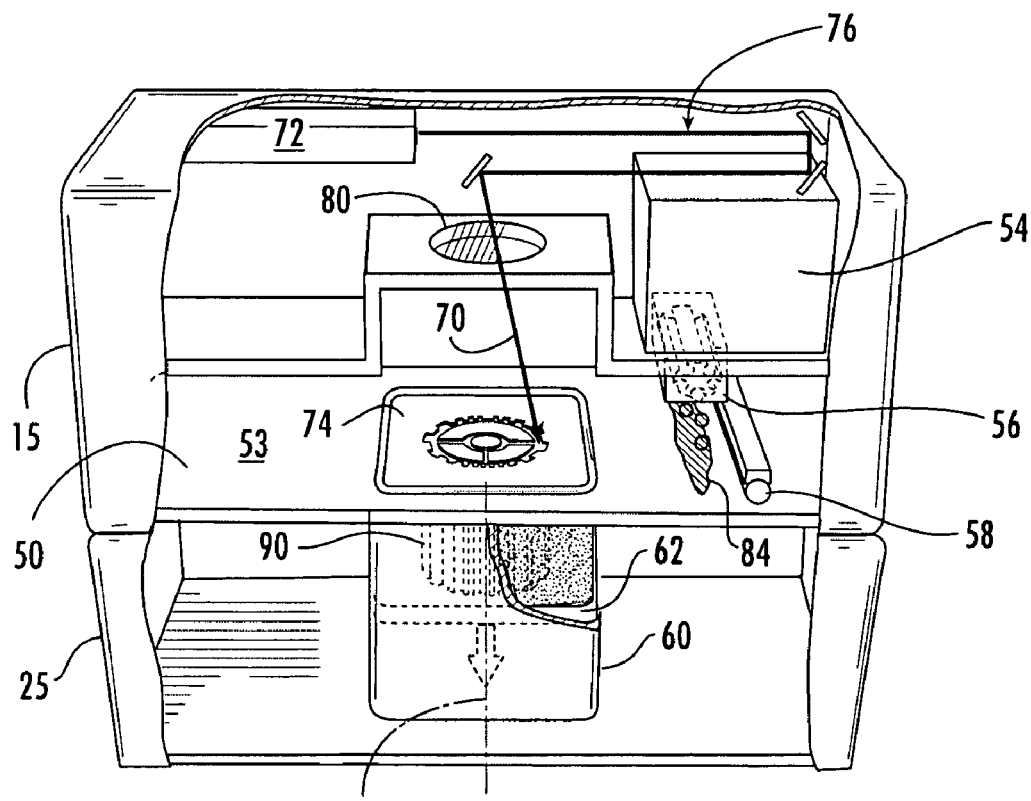

With reference to FIGS. 2A through 2C, a side perspective view of an exemplary process chamber 15 and build chamber 25 is illustrated. A portion of each of the process and build chambers is broken away for clarity. The process chamber 25 includes a powder bed 50 and an associated powder dispensing system having a powder feed hopper 54 and a bottom feed mechanism 56. The process chamber 15 also includes a powder spreader 58 that is adapted to pick up and spread the dispensed powder over the powder bed in a uniform manner. The powder bed 50 may include an opening 52 which is adapted to removably receive the build chamber 25. In the context of the invention, the term "powder spreader" includes rollers, wipers, doctor blades, or any other suitable device that may be used for spreading the powder across the powder bed in a uniform manner.

The build chamber 25 includes a build cylinder 60 having a moveable build platform 62. The build chamber may also include one or more overflow receptacles (not shown) that are adapted to receive any excess powder. In operation, the powder spreader 58 spreads the powder across the surface of the powder bed 50 and deposits a discreet layer of powder onto the surface of the moveable build platform 62 to form the part cake. As used herein, the term "part cake" refers to the layer(s) of heat-fusible powder, including the sintered and unsintered powder, that has been deposited onto the surface 63 of the build platform. Build platform 62 may be controlled by a motor (not shown) to move downwardly below the powder bed 50 in small incremental steps, for example 0.125 mm, to define the thickness of each layer of the powder to be processed. The motion is not limited to unidirectional, e.g. a downward motion of 0.500 mm followed by an upward motion of 0.375 mm will result in a final downward position that is 0.125 mm lower than the last step. Typically, the build platform is moveable within the build cylinder along an axis 57 of vertical travel (see FIG. 2C).

Preferably, the powder bed 50 defines a horizontal plane that is substantially perpendicular to the vertical travel of the build platform in the build cylinder when the build chamber is properly positioned and aligned in the build position. As used herein, the term "vertical travel" refers to the movement of the build platform as it moves within the build cylinder. Proper alignment of the powder bed with the vertical travel of the build platform throughout the build cycle is necessary to ensure that the part is not distorted. For example, during a build operation, the dispensing system dispenses a measured amount of powder onto the powder bed. The powder spreader then traverses across the powder bed one or more times distributing a uniform layer of powder across the surface of the build platform to form the part cake. If the vertical travel of build platform is not properly aligned with the surface 53 of the powder bed or becomes improperly aligned, each resulting layer of fused powder deposited on the build platform may be off-set from the nominal or expected position of the layer. As a result, the dimensions of a part built thereon may be distorted, which may cause the part to be unusable.

As shown in FIG. 2A, the build chamber 25 is depicted as being moved upwardly in the direction of the process chamber 15. Continued upward movement of the build chamber causes the alignment surfaces on both the build chamber and the support housing to contact each other and align the build platform with the powder bed and opening 52. The process chamber may also include a seal 66 for creating a sealing relationship between the powder bed 52 and the build cylinder 60. Typically, the seal comprises a heat resistant elastomeric material that is effective to prevent the powder from passing between the interface of the powder bed and the build cylinder.

Operation of the selective laser system is shown in FIGS. 2B and 2C. A laser and its associated targeting mechanisms are shown mounted in a unit (see FIG. 1, reference number 40) above the process chamber. The process chamber maintains the appropriate temperature and atmospheric conditions for the fabrication of the part. The atmosphere typically comprises an inert atmosphere, such as nitrogen. The apparatus also may include an associated computer system (not shown) that is configured to operate the laser and its associated optics system. Typically, the computer may be programmed with information indicative of the desired boundaries of a plurality of cross sections of the part to be produced.

In FIGS. 2B and 2C the process chamber 15 and build chamber 25 have been joined together and a part 90 is depicted in the process of being built. After the chambers have been joined, a laser beam 70 is generated by laser 72, and aimed at target surface or area 74 by way of scanning system 76 that generally includes galvanometer-driven mirrors which deflect the laser beam. As used herein, the term "target area" refers to the top surface of the part cake. The laser and galvonmeter systems are normally isolated from the process chamber 15 by a laser window 80. In some embodiments, the process chamber 15 may also include one or more radiant heaters (not shown) that heat the target area of the part cake and an area of the powder bed adjacent to the part cake. The deflection and focal length of the laser beam may be controlled, in combination with modulation of the laser 72, to direct laser energy to those locations of the fusible powder layer corresponding to a cross-section of the part to be formed in that layer.

In the illustrated embodiment, the process chamber 15 includes a powder dispensing system comprising a single powder feed hopper 54 with a bottom feed mechanism 56 controlled by a motor (not shown) to control the amount of powder dropped onto the powder bed 50 below. The feed mechanism may be of several types including, for example, a star feeder, an auger feeder, or a rotary drum feeder. In some embodiments, the powder dispensing system may comprise one or more feed pistons that are disposed within the build chamber. In this embodiment, one or more feed piston(s) push up a measured amount of powder into the powder bed. Thereafter, the powder spreader 58 picks up and spreads the powder over the powder bed and build platform in a uniform manner. In another alternative embodiment, the powder feed system may comprise a reciprocatable overhead hopper system having a blade attached to the bottom of the hopper opening to deliver and then spread the powder.

Powder spreader 58 may comprise a counter-rotating roller driven by a motor (not shown) that spreads powder from powder wave 84 across the laser target area 74. In some embodiments, the powder spreader carries any residual powder not deposited on the target area 74 into overflow mechanisms (not shown) that may be disposed at opposing ends of the process chamber. Although the use of a counter-rotating roller is preferred, the powder can be spread by other means including a wiper or doctor blade. In some embodiments, the powder spreader may comprise a leveling roller having a transverse axis that extends laterally across the surface of the roller. When the build chamber is positioned in the build position, the plane defined by the travel of the powder spreader across the powder bed is substantially perpendicular to the vertical travel of the build platform. Substantially perpendicular as used herein means that the some deviation from 90 degrees is permitted provided that the dimensional accuracy of the part remains acceptable.

Figure 3:
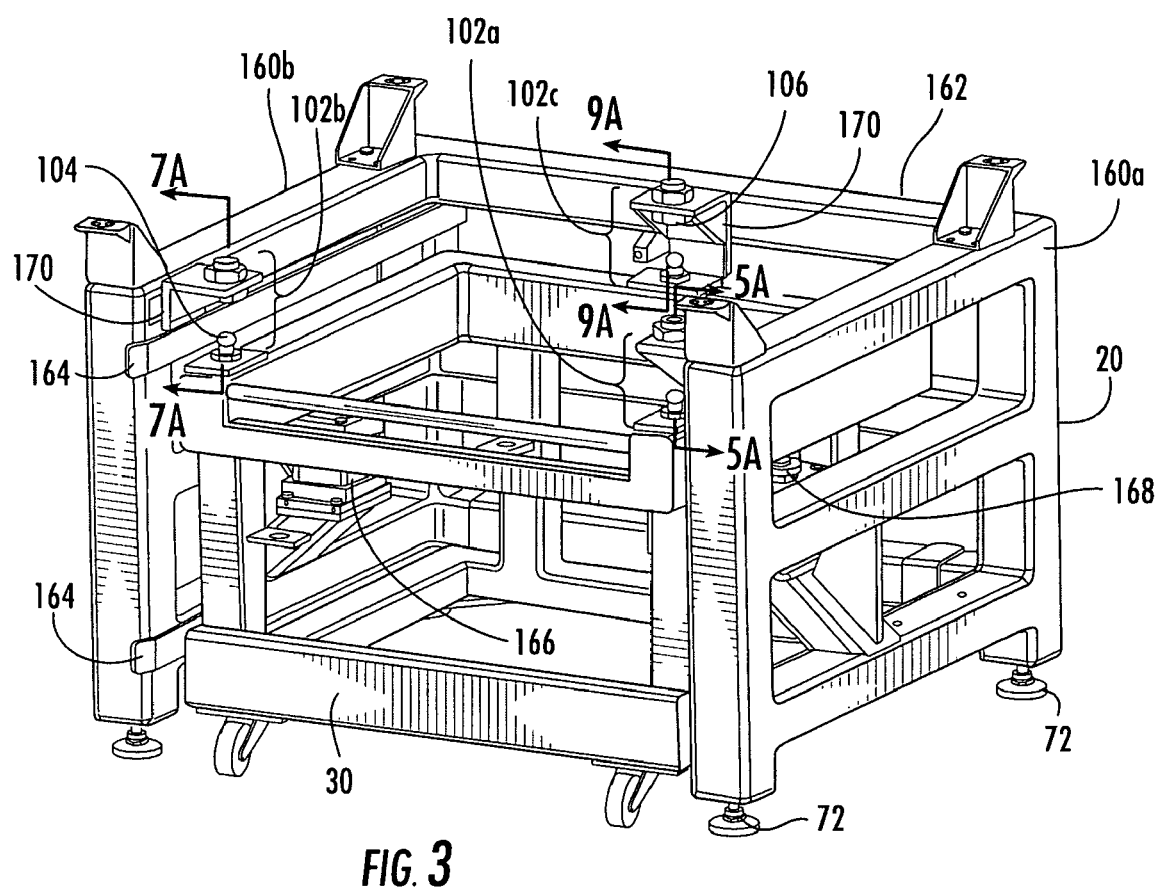
FIG. 3 is a graphical illustration of the support housing and build carriage.

As discussed above, the build chamber may include a moveable build carriage and a plurality of alignment surfaces that are each adapted to releasably engage a corresponding surface on the support housing. In this regard, FIG. 3 illustrates a rapid prototype apparatus having a plurality of alignment surfaces that are each adapted to releasably engage a corresponding surface disposed on the support housing 20. In FIG. 3, the process chamber and build chamber have been removed for clarity. Each alignment surface and its corresponding counterpart are collectively referred to as an alignment pair. In the embodiment illustrated in FIG. 3, the apparatus includes three alignment pairs which are broadly designated as reference numbers 102a, 102b, and 102c. In some embodiments, the apparatus may include three alignment pairs so that when the build chamber is moved into the build position, the alignment pairs define a plane that is substantially parallel to the plane defined by the surface of the powder bed (see FIG. 2A, reference numbers 53). The use of three pairs of alignment surfaces is preferred because three points uniquely define a plane. However, it should be recognized that it may be possible to use more than three alignment pairs if care is taken to ensure that they are coplanar.

During assembly of the apparatus, the positions of each of the alignment surfaces on the build chamber are aligned with the build platform, and the positions of each of the corresponding surfaces on the support housing are aligned with the powder bed and powder spreader. As a result, when the build chamber is moved upwardly towards the build position, the alignment pairs cause the position of the build chamber to shift so that the build chamber and process chamber have the correct horizontal and vertical alignment. In the context of the invention, the term "horizontal alignment" refers to the front-to-back and side-to-side (i.e., X and Y directions) position of the build chamber with respect to the process chamber. The build chamber is considered to have the correct horizontal alignment when the build cylinder is aligned with the opening in the powder bed and a sealing relationship may be established therebetween. The term "vertical alignment" refers to the up and down (Z direction) movement of the build chamber with respect to the process chamber. The build chamber is considered to have the correct vertical alignment when travel of the build platform within the build cylinder is substantially perpendicular to the plane of the powder bed. Correct vertical alignment is maintained throughout the build process so that as the build platform moves within the build cylinder, the travel of the build platform remains substantially perpendicular to the plane of the powder bed. In some embodiments, the travel of the build platform is substantially perpendicular to the transverse axis of the powder spreader, such as a leveling roller.

The support housing 20 may comprise a framed structure having opposing side walls 160a, 160b and a rear wall 162 that together define an interior space in the support housing. The support housing may also include an opening (see FIG. 10, reference number 22) opposite the rear wall 162 through which the build carriage 30 may be removably inserted into the interior space. The support housing may also include guide rails 164 that help direct the placement of the build carriage within the support housing. In some embodiments, the support housing may also include at least one lifting device that is adapted to move the build chamber between a load position and a build position. In some embodiments, the support housing includes two lifting devices 166, 168 for supporting and lifting the build carriage upwardly. Suitable lifting devices include hydraulic or pneumatic cylinders, electric motors and the like. Leveling feet 72 may help a user to properly align the level of the support housing so that the build chamber may be easily inserted into the interior space of the support housing.

In some embodiments, one or more of the alignment pairs 102a, 102b, and 102c may comprise a projection that extends outwardly from the build carriage and a corresponding recess disposed on the support housing that is adapted to receive the projection. In this regard, FIG. 3 illustrates an embodiment wherein at least one of the alignment pairs comprises an outwardly extending projection 104 and a recess (not visible) that is adapted to receive the projection therein. In some embodiments, each recess may be disposed in a receiver 106 attached to the support housing. Here, the receivers 106 are each shown as being supported by brackets 70 that extend inwardly from the sidewalls or the rear wall in the direction of the interior space. In FIG. 3, the outwardly extending projections 104 are depicted in the form of a tooling ball. It should be recognized that other shapes and surfaces, such as a post, cylinder, block, or combinations thereof may be used provided that the build platform is properly aligned with the powder bed and the powder spreader when the build chamber is in the build position. For the sake of simplicity, each alignment surface on the build carriage will hereinafter be referred to as a "tooling ball." It should also be recognized that the orientation of the recess and the projection may be reversed.

Figure 4:
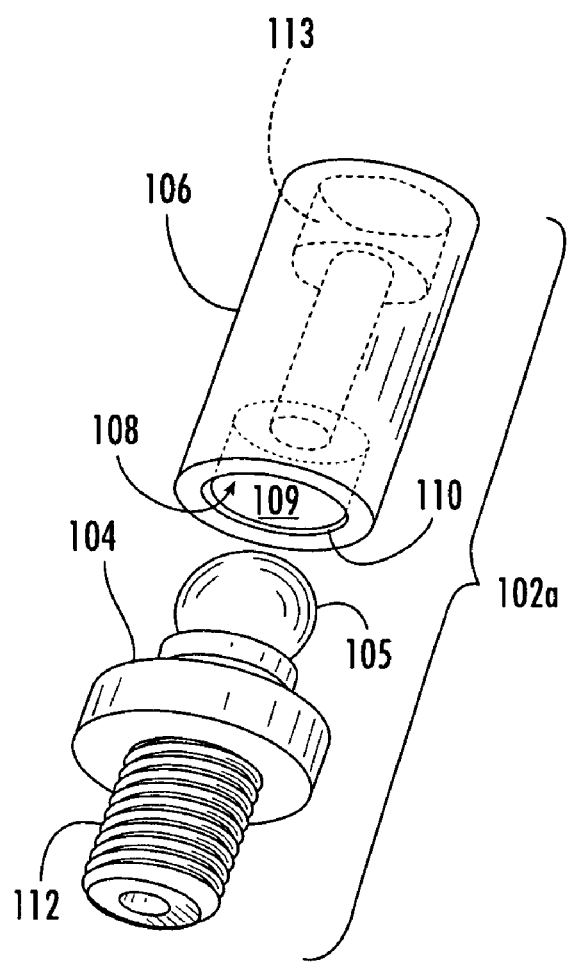
FIG. 4 is a graphical illustration of a pair of alignment surfaces that are used to precisely align the build platform with the powder bed.
Figure 5A:
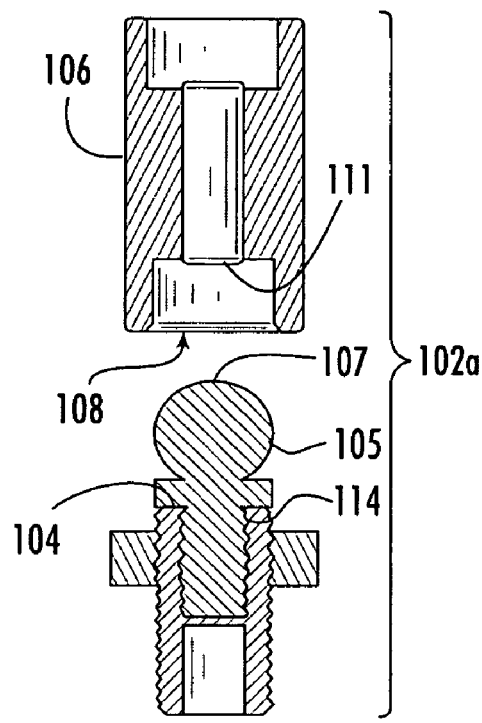
FIG. 5A is a cross sectional view of the alignment pair of FIG. 4 viewed along line 5A of FIG. 3.

As shown in FIG. 4, the alignment pair may comprise a tooling ball 104 and a receiver 106 having a recess 108 that is adapted to releasably receive the tooling ball. In some embodiments, the receiver 106 may also have a chamfer 110 at the opening of the recess 108. The chamfer comprises a beveled surface that allows for some initial misalignment between with build chamber and the support housing. In this embodiment, each tooling ball engages the chamfer on the corresponding recess as the build chamber is moved upwardly. Continued upward movement of the build chamber causes the position of the build chamber to be shifted so that each tooling ball is inserted into a recess and becomes seated. As shown in FIG. 5A, the tooling ball 104 may be seated against a base 111 of the recess. In some embodiments, the tooling ball is seated when the top surface 107 of the tooling ball contacts the base 111 of the recess and further upward movement of the build chamber is prevented. In some embodiments, the apparatus includes three alignment pairs that when fully seated define a plane that is substantially parallel to the surface of the powder bed. As a result, when the tooling balls are each seated within their respective recesses, the build platform is properly positioned and aligned with the powder spreader.

In some embodiments, the tooling ball 104 may include a threaded shaft 112 that may be attached to a threaded bore 114 that may be used to join the tooling balls to the build carriage 30. In addition, in some embodiments, the receiver 106 may include a second recess 113 opposite the first recess 106. The second recess may be adapted to receive an additional aligning surface, such as tooling ball, which can be used to attach the process chamber or other equipment to the support housing.

In some embodiments, the rapid prototype apparatus includes three alignment pairs that may be configured differently from each other in an orientation that helps facilitate proper alignment of the build chamber and the process chamber with minimal or no adjustment by a user. In one embodiment, a first alignment pair may comprise a recess that is slightly larger than the size of the tooling ball so that the tooling ball has minimal to no movement within the recess; a second alignment pair may be configured to limit horizontal movement of the tooling ball in a first direction while allowing more horizontal movement in a second direction that is perpendicular to the first direction; and a third alignment pair may have an oversized recess that allows the tooling ball to fit rather loosely within the recess and have some freedom to move laterally in all directions.

Referring again to FIG. 3, the first 102a and second 102b tooling balls may be attached to opposing side walls adjacent to the opening of the support housing 20, and the third alignment pair 102c may be disposed on or in close proximity to the rear wall 162. The first and second alignment pairs may be positioned adjacent to the opening of the support housing so that their respective positions may be easily visualized by an operator positioning the build chamber within the support housing. The third coupling is typically disposed near the rear wall because the oversize recess allows the tooling ball to be easily aligned with the recess with little or no visualization. Typically, the third alignment pair 102c functions along with the first and second alignment pairs 102a 102b to define a horizontal plane that is substantially parallel to the surface of the powder bed when the build chamber is aligned in the correct vertical position.

Figure 5B:
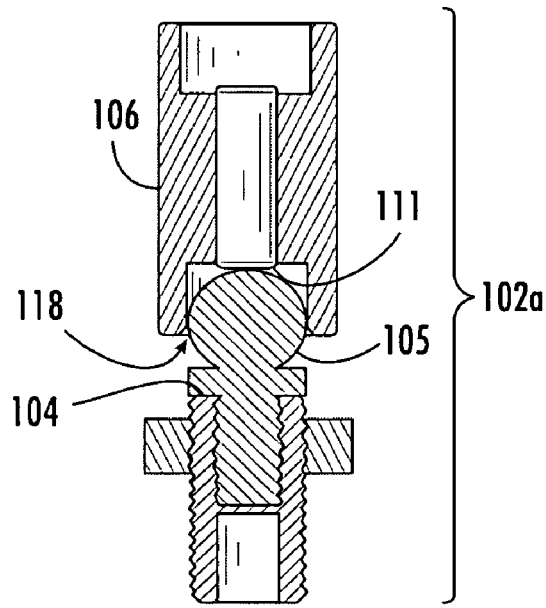
FIG. 5B is a cross sectional view of the alignment pair of FIG. 4 depicting the tooling ball seated in the recess.

The first alignment pair is illustrated in FIGS. 4, 5A and 5B. Typically, the clearance between the tooling ball 104 and the sidewalls 109 of the recess is less than about 5 mils (1 mil=0.001 inches), and somewhat more typically is less than about 2 mils. FIG. 5A is an illustration of the alignment pair 102a viewed along line 5A of FIG. 3. As shown in FIG. 5B, the clearance 118 between the surface 105 of the tooling ball and the inner sidewall 109 of the recess 108 is very slight so that the tooling ball has little to no allowed lateral movement when seated in the recess 108.

Figure 6:
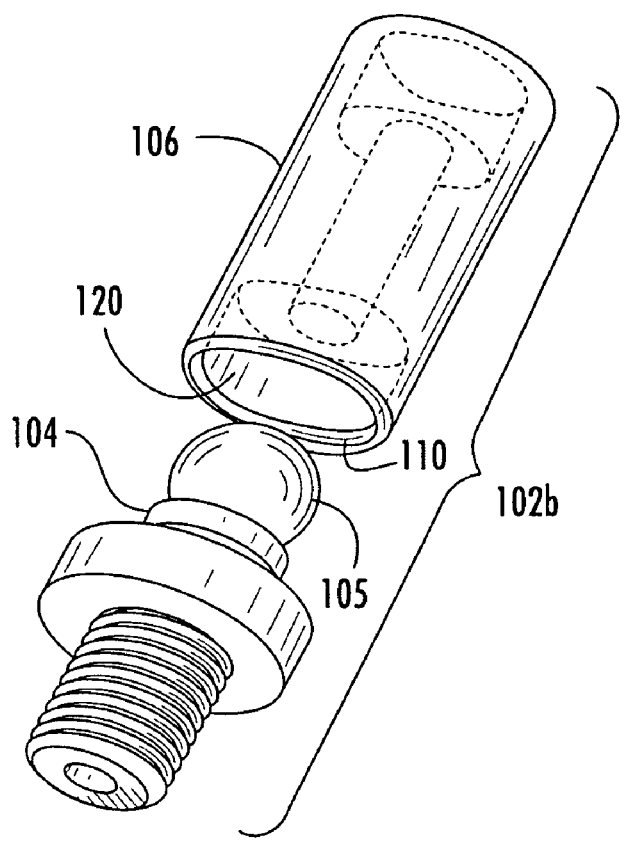
FIG. 6 is a graphical illustration of a pair of alignment surfaces that are used in conjunction with the alignment pair of FIG. 4 to precisely align the build platform with the powder bed.
Figure 7A:
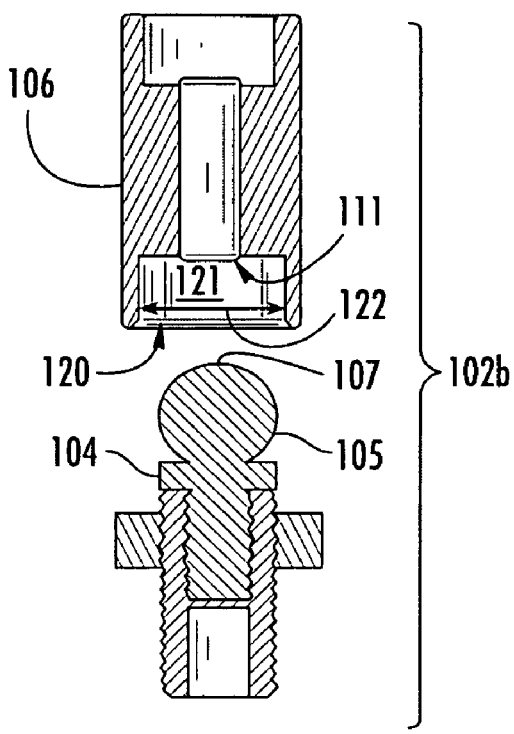
FIG. 7A is a cross sectional view of the alignment pair of FIG. 6 viewed along line 7A of FIG. 3.
Figure 7B:
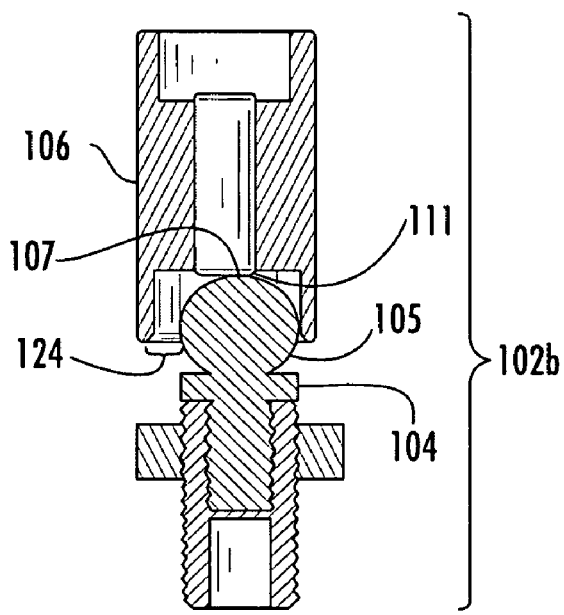
FIG. 7B is a cross sectional view of the alignment pair of FIG. 6 depicting the tooling ball seated in the recess.

The second alignment pair 102b is illustrated in FIGS. 6, 7A and 7B and may be configured to allow slight lateral movement in a first horizontal direction while limiting lateral movement in a second horizontal direction. As shown, the second alignment pair 102b may comprise a recess 120 having an oblong or rectangular shape. In this embodiment, the recess has a length that is greater than its width. FIG. 7A is an illustration of the alignment pair 102b viewed along line 7A of FIG. 3. From FIGS. 7A and 7B it can be seen that the clearance 124 between the sidewall 121 of the recess 120 and the surface of the tooling ball 105 is relatively greater along its length, as represented by axis 122. The tooling ball has relatively more freedom to move back and forth along axis 122 while at the same time movement of the tooling ball in a direction perpendicular to axis 122 (its width) is relatively limited. Typically, alignment pair 102b may be positioned on the support housing so that axis 122 intersects alignment pair 102a. In embodiments where alignment pair 102a, is positioned adjacent to the opening of the support housing, alignment pair 102b may be positioned on the support housing so that axis 122 or the length of the recess is aligned with the opening of the support housing and is parallel to the rear wall. The oblong or rectangular shape of the recess 120 allows more freedom in positioning the build chamber within the support housing. In combination, alignment pairs 102a, 102b position the build chamber so that is locked in the horizontal plane (i.e., X and Y directions). As a result, alignment pairs 102a, 102b position the build chamber so that the build platform becomes aligned with the opening of the powder bed as the build chamber moves upwardly.

The third alignment pair 102c is illustrated in FIGS. 8, 9A and 9B. The third alignment pair includes an oversized recess 130 that allows the tooling ball 104 more freedom to move laterally in all directions. FIG. 9A is an illustration of the alignment pair 102c viewed along line 9A of FIG. 3. From FIGS. 9A and 9B it can be seen that the clearance 132 between the sidewalls of the recess and the surface 105 of the tooling ball is relatively larger in comparison to alignment pairs 102a and 102b. As discussed above, alignment pair 102c may be positioned in or near the rear wall (see FIG. 3 reference number 162) to define a horizontal plane in conjunction with alignment pairs 102a and 102b. It should be recognized that the placement of alignment pairs 102a, 102b, and 102c on the support housing may be varied depending on preference provided that the axis 122 of alignment pair 102b intersects alignment pair 102a.

Figure 10:
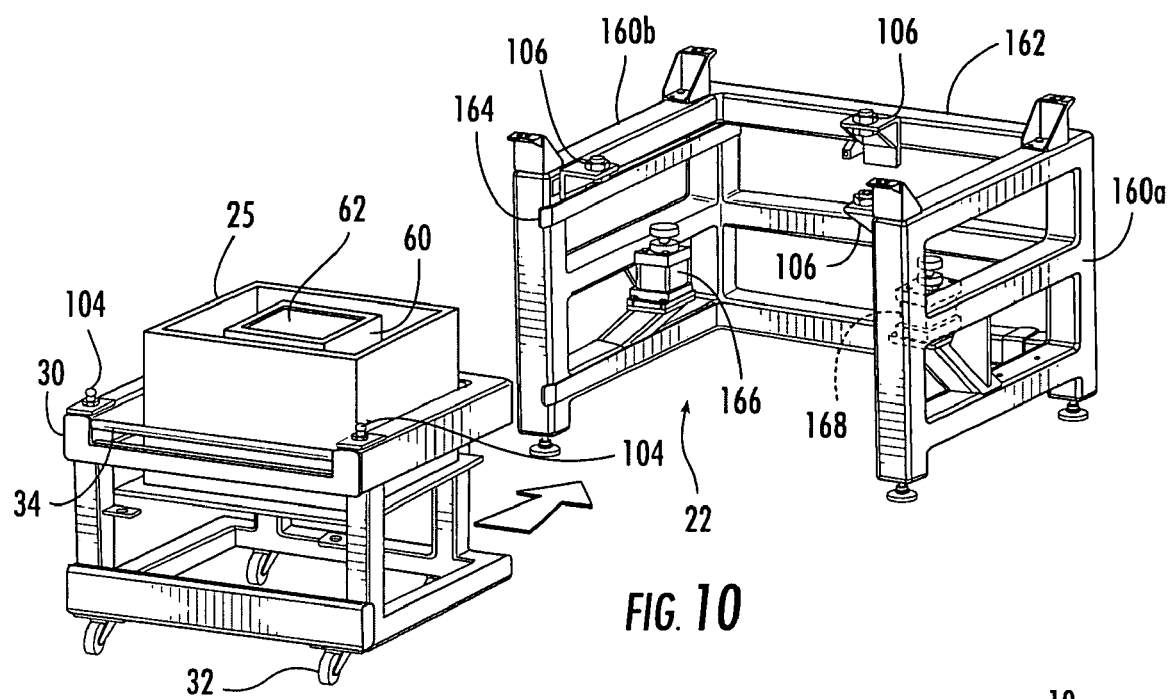
FIG. 10 is a graphical illustration of the step of inserting the build chamber into the interior space of the support housing.

With reference to FIGS. 10 through 13, the method of using the rapid prototype apparatus 10 to position and align the build chamber with the process chamber is illustrated in a stepwise manner. The process chamber and other associated devices are not illustrated for clarity. As shown in FIG. 10, the build chamber 25 including the build carriage 30 is inserted into the interior support housing through opening 22. Guide rails 164 help to position and guide the build carriage into the load position. The build carriage 30 may include one or more rollers 32 and a rail 34 or handles that may help a user to move and reposition the build chamber.

Figure 11:
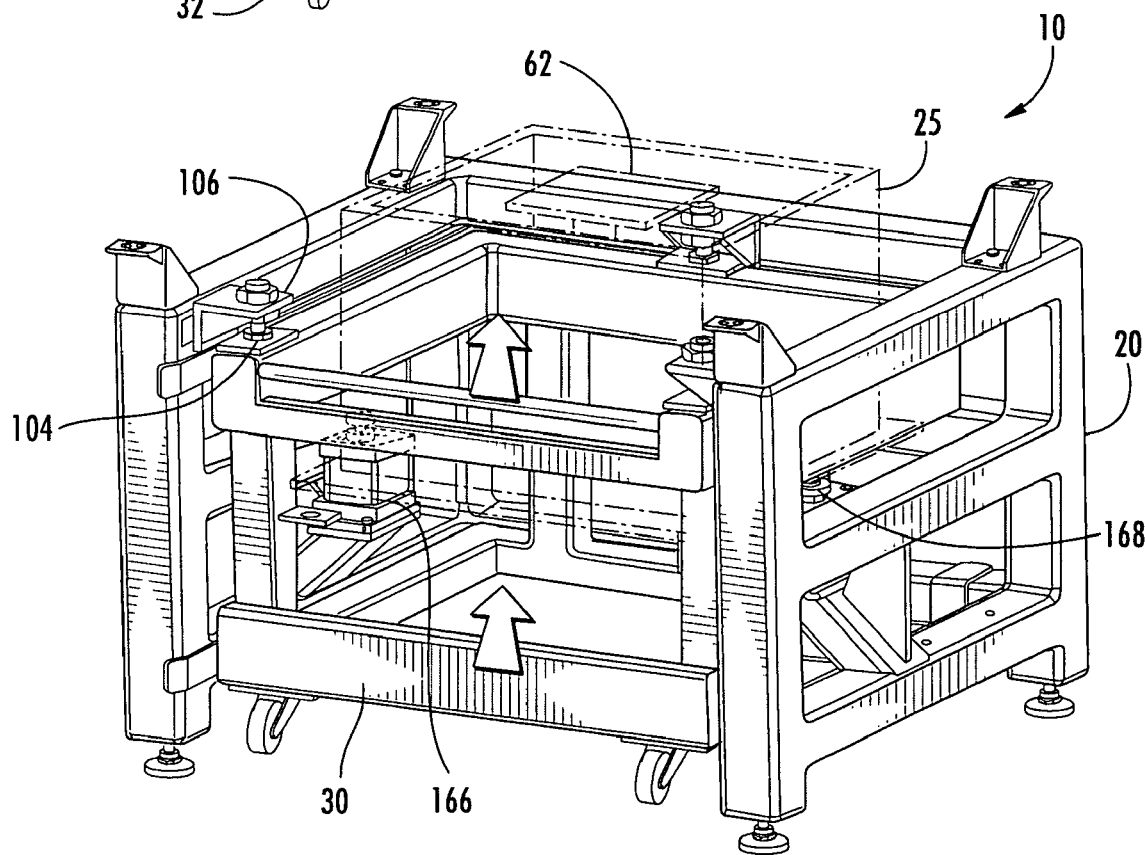
FIG. 11 is a graphical illustration of moving the build chamber from the load position to the build position.

In FIG. 11 the build chamber 25 has been inserted into the interior space of the support housing 20 and is now in the load position. Lifting devices 166, 168 then move upwardly and contact surfaces on the build carriage 30. The lifting devices then proceed to move the build chamber upwardly in the direction of the process chamber. Each tooling ball 104 releasably engages a corresponding recesses (see FIG. 4, reference number 108, for example) on the support housing. As discussed above, each recess may include a chamfer that allows for some initial misalignment of the build chamber. Continued upward movement causes the tooling balls to move upwardly along the chamfer and into the recesses. As a result, the build chamber is eased into correct alignment with the process chamber. The build chamber continues to move upwardly until each tooling ball is seated in the recess, at which time upward movement of the build chamber may be prevented. The build chamber is now in the build position. While in the build position, the build platform is horizontally and vertically aligned with powder bed and a sealing relationship exists between the build cylinder and the powder bed. A part may then be built as described above.

Figure 12:
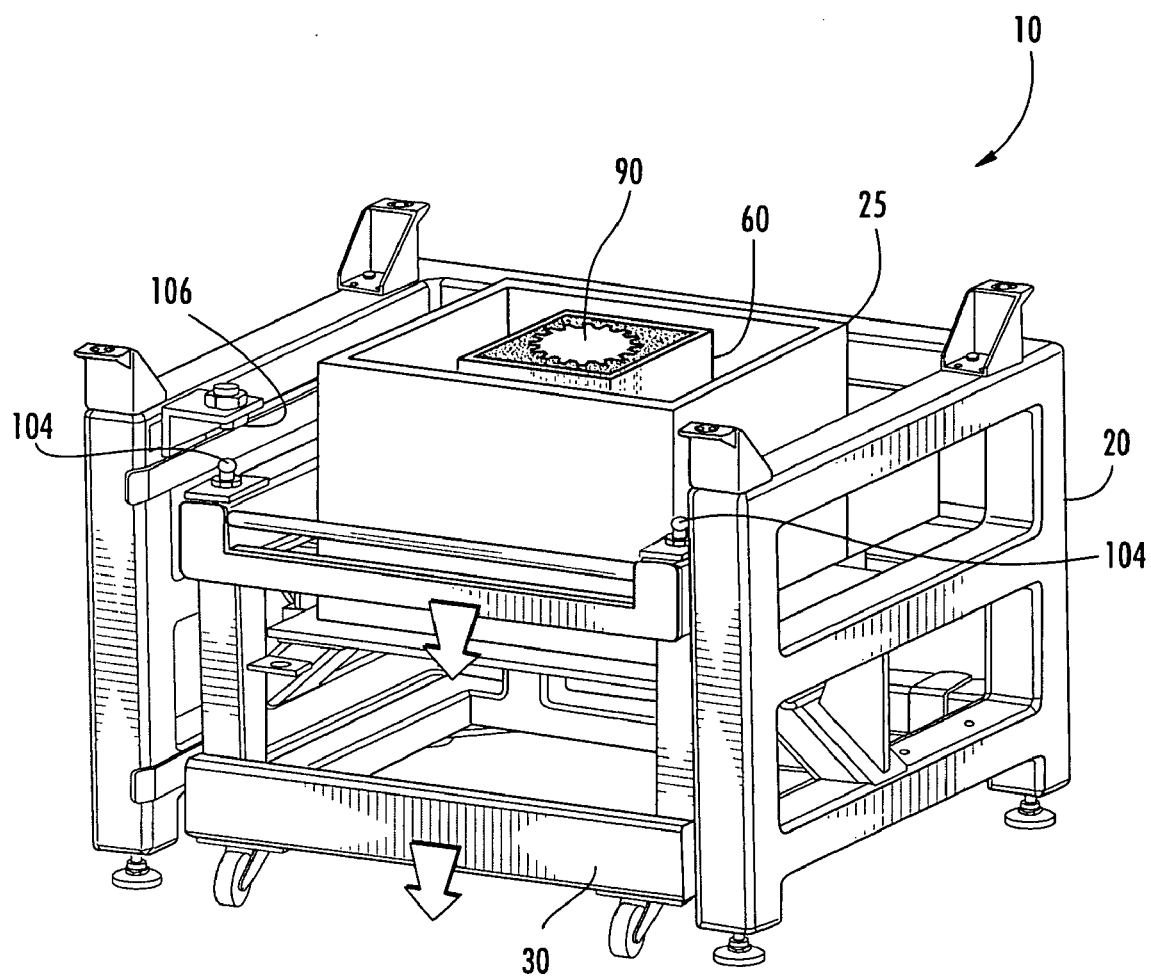
FIG. 12 is a graphical illustration of moving the build chamber with a newly built part from the build position to the load position.
Figure 13:
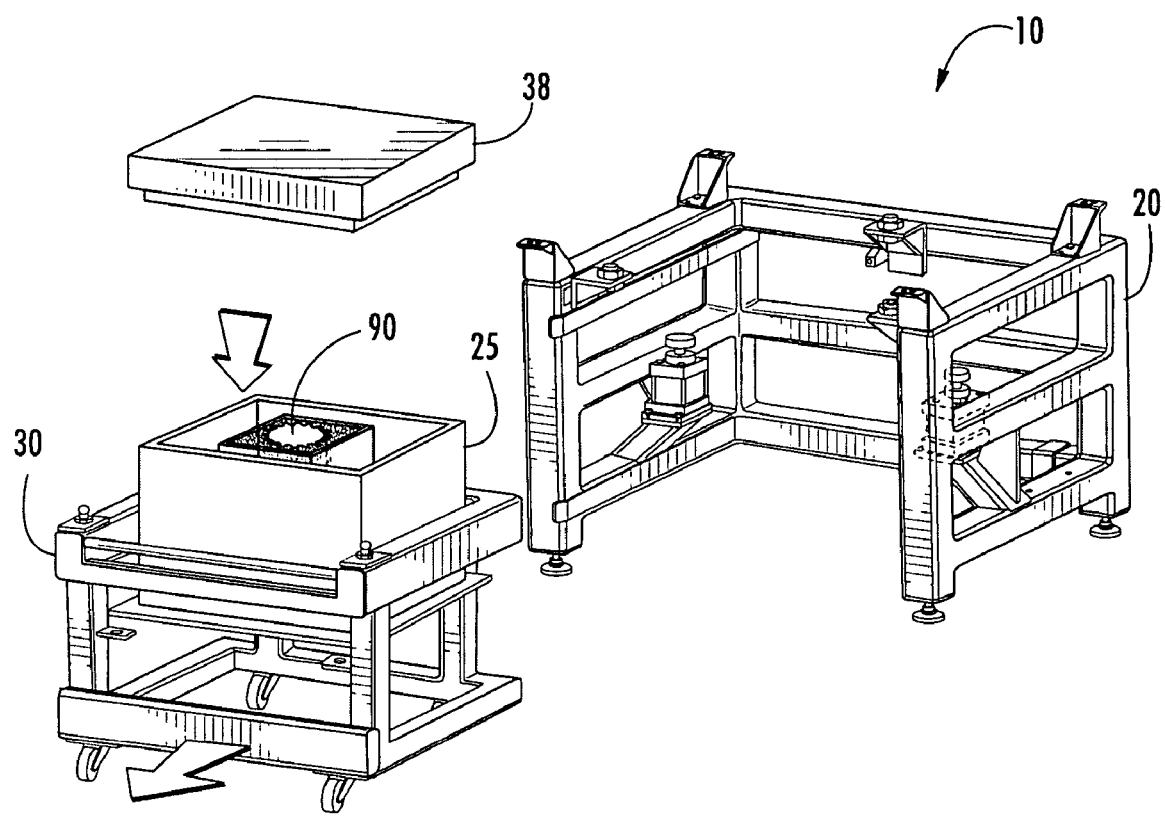
FIG. 13 is a graphical illustration of removing the build chamber from the support housing.

After completion of the part, the lifting devices move downwardly causing the build chamber to separate from the process chamber. In this regard, FIG. 12 depicts the build chamber 25 being moved downwardly into the load position. A newly formed part 90 (or set of parts) is shown in the build cylinder 60. In FIG. 13, the build chamber 25 is removed from the support housing 20. The process chamber can now be used to build a second part(s) while the newly formed part 90 continues to cool in the build chamber. In some embodiments, it may be desirable to enclose the interior space of the build chamber with a cover 38. The cover may help facilitate cooling of the part(s) 90 at a controlled rate. The build chamber may further include an insulating lining that also helps cool the part at a controlled rate. In some embodiments, the build chamber and/or cover may further comprise radiant heaters and/or an inert gas supply that may further facilitate cooling of the part in a controlled environment.

In some embodiments, the build chamber may be stationary and the process chamber may be moveable between a load position and a build position. In that embodiment, the alignment pairs align the process chamber to the build chamber as the process chamber is moved into the build position. Although the rapid prototype apparatus has been discussed generally in terms of an embodiment directed to selective laser sintering, it should be recognized that the invention may encompass other rapid prototyping methods such as stereolithography.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rapid prototyping and manufacturing apparatus comprising:
   a. a process chamber including a powder bed and a support housing, said support housing having at least three alignment surfaces;
   b. a build chamber removably attached to said support housing, said support housing having at least one lifting device operable to move said build chamber between a load position and a build position, said build chamber having a moveable build platform disposed therein that defines a target area when said build chamber is in the build position; and
   c. a moveable build carriage removably insertable into said support housing for inserting said build chamber into and removing said build chamber from said process chamber, said build carriage comprising at least three alignment surfaces corresponding to said support housing alignment surfaces in alignment pairs, two of which said pairs define horizontal alignment and one of which said pairs defines vertical alignment of said build platform with said powder bed when said build chamber is in said build position.

2. A rapid prototype apparatus according to claim 1, wherein said build chamber includes at least three alignment surfaces defining a horizontal plane within said build chamber, and wherein said horizontal plane is substantially parallel to said powder bed.

3. A rapid prototype apparatus according to claim 2, wherein said moveable build platform includes an axis of vertical travel that is substantially perpendicular to said powder bed.

4. A rapid prototype apparatus according to claim 2, wherein said support housing comprises an interior space defined by opposing side walls, a rear wall, and an opening opposite said rear wall, and wherein said build chamber is adapted to be removably inserted into said interior space.

5. A rapid prototype apparatus according to claim 4, wherein said plurality of alignment surfaces each comprise a projection and said corresponding surfaces each comprise a recess that is adapted to releasably receive one of said plurality of projections therein.

6. A rapid prototype apparatus according to claim 5, wherein at least one of said recesses is adapted to precisely position one of said projections in said support housing, and wherein said projection and said recess have a clearance that is less than about 5 mils.

7. A rapid prototype apparatus according to claim 5, wherein at least one of said recesses has a length greater than its width and is oriented relative to said support housing so as to substantially prevent movement of a projection disposed therein in a direction that is parallel to said opposing side walls and to permit limited movement of said projection in a direction that is parallel to said rear wall.

8. A rapid prototype apparatus according to claim 2, wherein said plurality of alignment surfaces each comprise a tooling ball.

9. A rapid prototype apparatus according to claim 1, wherein said at least one lifting device is a hydraulic press, pneumatic press, electric motor, or combination thereof.

10. A rapid prototype apparatus according to claim 1, wherein said support housing includes an interior space and an opening for removably receiving said build chamber therein.

11. An apparatus for producing parts from a powder comprising:
   a removable build chamber having a build cylinder and a moveable build platform disposed therein, said build chamber being moveable between a load position and a build position, and wherein said moveable build platform defines a target area when said build chamber is in the build position;
   a process chamber having a powder bed, an opening in said powder bed configured to removably attach to said build cylinder, and a powder spreader for spreading a layer of powder across said target area;
   a means for generating an energy beam for fusing selected portions of the layer of the powder at the target area;
   a powder dispensing system comprising at least one powder feed hopper for depositing a quantity of powder into said process chamber;
   a moveable build carriage for supporting said build chamber, said build carriage including at least three upwardly extending projections;
   a lifting device operable for moving the build chamber between the load position and the build position; and
   a support housing for supporting said process chamber and having an interior space disposed below said process chamber that is adapted to receive said build carriage therein, said support housing having at least one recess for each of said upwardly extending projections, the recesses each being structured and arranged for releasably receiving one of said upwardly extending projections therein, and wherein movement of said build chamber into the build position causes said upwardly extending projections to be removably received into said recesses whereby said build cylinder becomes aligned with said opening in said powder bed.

12. The apparatus according to claim 11, further comprising one or more radiant heaters for heating powder in said process chamber.

13. The apparatus according to claim 11, wherein said interior space is defined by two opposing side walls, a rear wall, and an opening opposite said rear wall.

14. The apparatus according to claim 13, wherein the build chamber comprises three upwardly extending projections, and wherein said support housing comprises
   a first recess disposed adjacent to a first of said side walls and adjacent to said opening, said first recess adapted to receive a first of said upwardly extending projections therein, and wherein a clearance between said upwardly extending projection and said first recess in a horizontal direction is less than about 5 mils;
   a second recess disposed adjacent to the second side wall and adjacent to said opening, said second recess adapted to receive a second of said upwardly extending projections therein, wherein the second recess has a length greater than its width, said length being parallel to the rear wall and said width being parallel to the first and second side walls such that the second upwardly extending projection has little to no freedom to move along the width of said second recess and relatively more freedom to move along the length of said second recess; and
   a third recess disposed adjacent to said rear wall and adapted to receive a third of said upwardly extending projections therein, and wherein a clearance between said third upwardly extending projection and said third recess is sufficient to allow said third upwardly extending projection to move laterally in all directions.

15. The apparatus according to claim 14, wherein said upwardly extending projections comprise a tooling ball and wherein said recesses include a chamfer for directing said upwardly extending projections into said recesses.

16. The apparatus according to claim 11, wherein said process chamber further comprises a seal disposed about the circumference of said opening, said seal comprising a heat resistant elastomeric material that is adapted to create a sealing relationship between said build cylinder and said powder bed.

17. The apparatus according to claim 11, wherein said means for generating an energy beam comprises:
   a. energy beam;
   b. an optics mirror system to direct the energy beam; and
   c. a computer system for controlling said energy beam and said optics mirror system, said computer system being programmed with information indicative of the desired boundaries of the a plurality of cross sections of the part to be produced.

18. The apparatus according to claim 17, wherein the energy beam is a laser energy beam.

19. A method of forming a three dimensional part by laser sintering comprising:
   (a) providing the apparatus of claim 11;
   (b) inserting said build chamber into said interior space;
   (c) moving said build chamber into said build position;
   (d) depositing a first quantity of powder onto said powder bed;
   (e) spreading said first quantity of powder across said target area to form a first layer of powder;
   (f) directing an energy beam over the target area causing the first layer of powder to form an integral layer;
   (g) lowering said build platform an incremental amount; and
   (g) repeating steps (d) to (g) to form additional layers that are integrally bonded to adjacent layers so as to form a three dimensional part.

20. The method according to claim 19, further comprising the steps of:
   moving said build chamber from the build position to the load position after the completion of step (g);
   removing said build chamber from said interior space; and
   allowing said part to cool within said build chamber.

21. The method according to claim 19, wherein the step of moving said build chamber into said build position further comprises aligning said build platform with said powder bed.

22. The method according to claim 21, wherein the step of moving said build chamber into said build position further comprises creating a sealing relationship between said powder bed and said build cylinder.

23. The method according to claim 21, further comprising placing a cover over said build chamber.

* * * * *